United States Patent [19]

Simon et al.

[11] 4,301,182

[45] Nov. 17, 1981

[54] PROCESS FOR PRODUCING A FISH PRODUCT

[75] Inventors: Frank J. Simon, San Marcos; William C. Reinke, Delmar, both of Calif.; Stanley H. Richert, Webster Groves, Mo.

[73] Assignee: Ralston Purina Company, St. Louis, Mo.

[21] Appl. No.: 160,695

[22] Filed: Jun. 18, 1980

[51] Int. Cl.$^3$ .................. A23L 1/275; A23L 1/277; A23L 1/325

[52] U.S. Cl. .................. 426/250; 426/261; 426/643; 426/516

[58] Field of Search .............. 426/250, 261, 643, 652, 426/516

[56] References Cited

U.S. PATENT DOCUMENTS

| | | | |
|---|---|---|---|
| 1,608,832 | 11/1926 | Birdseye | 426/643 |
| 2,827,383 | 3/1958 | Gorton, Jr. | 426/282 |
| 3,493,391 | 2/1970 | Pottie | 426/643 |
| 3,579,359 | 5/1971 | Schjolberg | 426/513 |
| 3,852,505 | 12/1974 | Rubin | 426/513 X |
| 3,863,017 | 1/1975 | Yueh | 426/643 |
| 4,060,644 | 11/1977 | Braid | 426/643 X |
| 4,136,204 | 1/1979 | Hughes et al. | 426/643 X |

FOREIGN PATENT DOCUMENTS 1240497 7/1971 United Kingdom ............... 426/643

*Primary Examiner*—Robert A. Yoncoskie
*Attorney, Agent, or Firm*—Joseph M. Hageman

[57] ABSTRACT

Red or dark meat portions of whole fish are restructured and preferably combined with light meat fillets or loins to produce a palatable, nutritious fish product. The process comprises comminuting the red meat, trim, including bellies, carcass and skin of the fish to form a minced meat mass that is colored with a heat stable dye to resemble the natural color of the fish and delicately extruded through an orifice at room temperature, the minced meat is then heat set or cooked and decolored and dewatered to form a restructured product which, after retort cooking, has the chewy texture, aroma and flavor and color of the more desirable loin or fillet portions of the fish. The restructured product may be combined with cooked loins or fillets to produce a product which closely resembles 100% loins or fillets.

13 Claims, No Drawings

PROCESS FOR PRODUCING A FISH PRODUCT

BACKGROUND OF THE INVENTION

This invention relates to restructured fish product and more particularly, to a method of producing a fish product that utilizes about 50% to about 60% by weight of the whole fish.

A substantial portion of the available protein in fish is discarded during processing and used as animal feedstuff or fertilizer. The portion of the fish that is utilized in animal feedstuffs comprises red meat, trimmings, including tails, carcasses and skin, etc., which normally aren't acceptable in terms of appearance as an ingredient in human foods. The unacceptability of certain portions of fish for human consumption leads to processing inefficiencies and a void in filling the nutritional needs of individuals.

Efforts have been made to produce acceptable products for human consumption from the red or dark meat portions of fish. British Patent 1,108,188 shows the extraction of fish protein by treating fish for two hours at a pH of about 13 and a temperature of 50° C., and after purification, the solution is deodorized with a peroxide solution having a concentration of 0.015% by weight, and a pH of 8.5, at a temperature of 80° C., for two hours. U.S. Pat. Nos. 4,060,644 and 4,136,204 show the bleaching of undissolved fish skeletal meat with a dilute aqueous solution of hydrogen peroxide and up to 10% by weight polyphosphate, preferably sodium tripolyphosphate at a pH of 10.5 to 11.5. The hydrogen peroxide is removed with catalase at a pH of 7.5 to 8.0. The pH of the bleached fish is then lowered to 6 to 7 by being washed with a food acid. There is no indication of improved texture of this product particularly when combined with light colored fish meat.

In British Pat. No. 1,400,876, the use of hydrogen peroxide to decolorize fish flesh at a pH of not more than 9.5 and at a temperature of between 30° and 70° C., is shown. Trash fish flesh is mixed with aqueous sodium hydroxide and heated to 50° C. The disclosure states the protein recovered from solution is unsuitable as a substitute or filler for animal proteins for human consumption because of inadequate nutritional quality. A protein isolate is prepared in U.S. Pat. No. 3,879,370 which is decolorized by hydrogen peroxide and deodorized by extraction with isopropanol. The nutritional value of the white isolate powder is adequate but it has undesirable texture for a restructured meat product.

The present invention relates to a process and product wherein dark meat from fish is restructured and substantially decolored to provide a nutritious, palatable food product and in a preferred embodiment, combined with light meat from fish to provide a palatable, nutritious fish product utilizing up to about 50% to about 60% by weight whole fish.

SUMMARY OF THE INVENTION

The present invention comprises a process for decolorizing and restructuring red or dark meat of fish so that it resembles the white or light meat fillet or loin portions of fish. The dark meat is colored with a heat stable dye, formed, heat set and decolorized by treatment with hydrogen peroxide, and then optionally blended in proportions of 40% to 80% by weight with the light meat loin portions of the fish. The decolored meat resembles the light meat in fiber, length, texture, flavor and color so the resultant product appears to be substantially 100% loin meat.

It is an object of the present invention to restructure and decolor the dark or red meat portions of fish.

Another object is to prepare a nutritious decolored meat product similar in appearance to loin portions of fish having a light color.

And yet another object of the present invention is to prepare a decolored, restructured meat product which can be combined with loin portions of the fish in a ratio of about 40 to 80% by weight so that about 50% to about 60% of the whole fish, preferably about 95% of the available muscle meat, may be utilized as a human food source.

DETAILED DISCUSSION

Substantially all portions of fish may be utilized efficiently and economically in the process of the present invention to provide a fish product acceptable and palatable to human tastes. Although there are many types of fish processed and used commercially, this invention was conceived and developed leargely for the decoloring and restructuring of red or dark meat found in tuna and tuna-like species which include, but is not limited to, skipjack, yellowfin, albacore, bonito, blue fin, big eye, yellowtail, mackeral, etc. The utilization of fish according to the improved process of the present invention increases process flow efficiencies so that small fish, up to nine to eleven pounds in weight, can be processed for canning in an efficient, economical manner. Previously, by-products of the fish processing have been converted to fish meal and animal foods. The present invention permits the utilization of red or dark meat, from trimmings, bellies, bone and minimal amounts of skin in a palatable nutritious food product acceptable for human consumption.

The preferred starting material is fresh or thawed tuna or tuna-like fish weighing about nine to eleven pounds. Both larger and smaller fish may be processed efficiently and economically, but due to increased fishing pressure of selected species, the average size of the preferred fish utilized by tuna canners, skipjack and yellowfin tuna, has been decreasing. The size of the fish is not intended to be limiting, but is merely suggested due to the availability of fish. Fish can be economically processed according to the present invention that weigh as little as one pound or as much as one hundred pounds or more.

In accordance with the present invention, the head and viscera of the fish are removed mechanically or manually depending on the size of the fish. For the sake of efficiency, this operation is preferably performed mechanically particularly on fish weighing nine pounds or less. Additionally, the loins or fillets can be removed from the fish at this time. This step can also be performed manually or by machine but the result is to produce loins or fillets of the white or light colored portions of the fish. The red meat portions of the fish particularly, the red meat found in the loin or fillet extending laterally through the loin parallel to the backbone of the fish, can be removed manually from the loin with a sharp knife. The red meat is trimmed off loin or fillet portions and separated. The loins are then skinned manually or by machine in such a manner to minimize cutting loss. The loins are then passed through a continuous cooker at a temperature sufficient to create an internal temperature of 47° C. to 66° C., preferably 55° C. to 58° C. for loins. The duration of cooking is dependent on the size of the loin. The loins are then cooled and cut or diced into fibrous bundles. With no intentions to be unduly limitative, the loins may be diced so that the layers of fibers are in 1 cubic inch chunks of fish muscle. Alternatively, the loins may be cooked prior to the trimming of the red or dark meat.

The red or dark meat portions including the trimmings from the light meat loin or fillets, skin, and carcass contain appreciable quantities of highly nutritious flesh but have a low commercial value when converted to fish meal or animal food because of the high content of bone and fat, the poor color and limited storage capacity. In accordance with the present invention, the above-mentioned materials can be easily produced into a product acceptable for human consumption. These materials are subjected to mechanical bone removal methods. With no intention to limit the present invention, suitable methods of achieving separation of bone and other hard inedible material include a process where flesh is pressed through perforations in a drum, while leaving the bone. Deboning devices which utilize this process are manufactured by Beehive Machinery, Inc., Sandy, Utah and Nordischer Maschienbau Rnd. Baader, Lubeck, Germany. Preferably, the carcass and the skin are passed through the device before the other materials. The bone residue is separated and made into bone meal or other by-products.

The fish obtained after removal of substantially all of the bone will usually be in the form of minced meat or finely divided fish muscle.

The comminuted minced meat or finely divided fish muscle mass is then restructured. The minced meat is preferably mixed with an oil to facilitate restructuring and to provide a better mouthfeel. Optionally, about 1–20% unsaturated vegetable oil may be admixed with the minced meat. Preferably, however, a hydrogenated vegetable oil such as many commercially available as general purpose or all purpose vegetable oil or shortening in a liquid or solid form at room temperature, is used in amounts ranging from about 1 to about 3% by weight, more preferably about 1% by weight. With no intent to limit the invention, the hydrogenated vegetable oils are preferred to prevent any unnecessary unsaturated fat from reacting in subsequent decoloring steps utilizing hydrogen peroxide.

An important sequence of steps in the process of the present invention involves the restructuring and decoloring of the minced meat. However, prior to restructuring, the minced meat must be treated with a suitable heat stable red dye, such as FD&C #3. The heat stable dye is added to the minced meat before restructuring and decoloring to insure the proper color of the fish is maintained through the steps of restructuring, decoloring and retorting the meat product. Accordingly, an effective amount of any conventional heat stable red dye may be added to the minced meat to match the natural color of the fish, preferably tuna after retorting. Preferably, amounts ranging from about 10 to about 30 mg of the heat stable red dye are added to each kilogram of minced meat, preferably 20 mg/kg.

As a flavoring aid, whole dried egg may optionally be added to the minced meat in an amount ranging from about 0.5 to about 2% by weight, preferably 1% by weight.

The minced meat mass is thoroughly mixed, cold extruded and cooked to restructure the meat fibers to the desired texture and consistency. The restructuring of the minced meat can be most conveniently carried out in an extrusion device where the minced meat is mechanically worked and passed through a restricted orifice. Cold extrusion refers to a process wherein the material is thoroughly mixed, preferably mechanically worked and passed through a restricted orifice at room temperature. Any suitable cold extrusion device may be utilized such as a Bach filler manufactured by Phillip Bock Manufacturing Company of Los Angeles, California with a simple pump to extrude the minced meat through a restricted orifice into ribbon-like strands approximately one inch wide and ⅛ inch to 1/16 inch in thickness. Another suitable cold extrusion device is a pump manufactured by Waukeshaw Manufacturing Company of Waukeshaw, Wisconsin 53186 wherein the minced meat material is pumped through a flexible plastic hose to a nozzle and extruded into a single double layered ribbon. The form of the extrudate is not intended to be limiting but it is preferred for it resembles flakes of tuna commonly recognized by the consumer. The ribbon-like extruded material is passed into a water bath at a temperature below that which will extract the oil present in the material. Usually 90° C. is preferred, however, the temperature may be as low as 75° C. The cooking or heat setting time depends upon the temperature of the water and the thickness of the extruded material. If the water temperature is 90° C. and the thickness of the product ⅛ inch to 1/16 inch, the protein present in the extruded material will become denatured in about sixty seconds. Other means within the knowledge of one skilled in the art besides a hot water bath may be utilized to heat set the ribbon like material. However, a hot water bath is preferred.

After cooking or heat setting, the temperature of the water may be decreased to about 70° C. prior to the addition of hydrogen peroxide. Alternately, the heat set extruded material may be removed and placed in another water bath at this temperature. The pH of the solution should be in the range of 4.0 to 8.0, preferably 6.0 to 8.0. Any food grade alkaline material such as sodium hydroxide may be utilized to adjust the pH. The material is then immersed in the hydrogen peroxide solution for an effective time and at an effective temperature to obtain the color of tuna. An arbitrary tuna color has been determined on a Gardner Colorimeter, manufactured by Gardner Labs, Inc., Bethesda, Maryland 20014 to have the lightness L=40–50 after retort cooking. The tuna color after decoloring should be about L=58. The rate of color lightening is a function of hydrogen peroxide concentration, temperature and time. The concentration of the hydrogen peroxide may range from about 0.2 to 1% by weight hydrogen peroxide. About a one hour reaction time at room temperature with 0.5% hydrogen peroxide would be suitable for obtaining a tuna color in the heat set extruded minced meat material. The same concentration of hydrogen peroxide at 50° C. would require a reaction time of about one-half hour.

The decolored material may be removed from the hydrogen peroxide solution and allowed to drain. The residual hydrogen peroxide can be removed by any standard technique which does not leave any deleterious matter in or on the fish. The hydrogen peroxide can be removed by water washing or by compressing lightly to squeeze out excess liquid. A preferred method is to contact the decolored fish with a dilute solution of catalase contaning about 50 units of catalase per kg of decolored minced meat material. The catalase can be easily removed by draining since the minced meat is dewatered to about a level of 30% solids, similar to the solids level of loin meat.

About 40% of the extruded heat set, decolored minced meat may be diced and mixed with about 60% of the diced loin meat. This ratio is variable and not intended to be limiting, for ratios of 80/20, 70/30, 60/40, 55/45, 50/50 and 45/55 produced acceptable and palatable canned tuna products. After combining of the loin and decolored minced meat, the mixture is canned and retorted in accordance with conventional procedures.

Accordingly, the process of the instant invention produces a decolored, restructured product that has the texture, flavor and aroma of loin portions of fish.

The following examples are for purposes of illustration and are not intended to be limiting. For example, various modifications may be made such as the use of other types of fish material and other types of extrusion and heat setting equipment.

EXAMPLE I

Thawed, skip jack tuna weighing about 6 to 8 pounds were butchered and weighed for a total whole fish weight of 238 kilograms. They were mechanically separated into 64.5 kilograms of loin and 62.7 kilograms of minced meat which comprise mechanically deboned collars, carcass, red or dark meat portions and skin. The minced meat was then mixed with 5 liters of soybean oil, 450 grams of dried whole egg and 1.26 grams of FD&C Red #3. The mixture was then added to the hopper of a Bach Filler and extruded through a ⅛ inch by 1 inch orifice into 200 liters of water maintained at a temperature of 83° C. As the ribbon of material was heat set in the water bath, the bath was stirred to prevent the agglomeration of the ribbon. The water bath containing structured meat in ribbon form was then cooled to 55° C. and then 1.5 liter of a 30% hydrogen peroxide solution was added to initiate decoloring. The water bath was occasionally stirred, and after 60 minutes, the color of the structured meat was read on a Gardner Colorimeter. This reading was L=59. The water and decolored restructured meat in ribbon form were cooled to 45° C. and an excess of catalase was added. The solution was held at this temperature for 20 minutes with occasional stirring. The absence of peroxide was noted when the gas bubbles eluting from the solution had disappeared. The decolored, restructured material was then drained and pressed by hand to remove excess water.

Simultaneous to the preceeding decoloring procedure, the loins were cooked with steam at 100° C. to an internal temperature of 55° C. and cooled. The loins resulting from this operation were diced to a particle size of about 1"×1"×1" and mixed with the decolored, restructured material in a ratio of about 55/45. The mixture was then canned and retorted. The product was then reviewed by a taste panel which concluded it had similar aroma, taste, mouthfeel, color and texture as chunk light tuna.

Having described the present invention with reference to these specific embodiments, it is to be understood that numerous variations may be made without departing from the spirit of the present invention and it is intended to encompass such measurable variations or equivalents within the scope thereof.

What is claimed is:

1. A process for producing a fish product resembling in color fish having light colored loin meat comprising:
   comminuting red or dark meat portions of fish including trim, bellies, carcass and skin to form a minced meat mass,
   adding a heat stable red dye to said minced meats in amounts such that the color of the minced meat matches the natural color of fish loin after retorting,
   mechanically working and extruding the minced meat mass through a restricted orifice at room temperature,
   heat setting or cooking the extruded minced meat, and decoloring the extruded minced meat so that it resembles in color the loin portions of fish.

2. The process of claim 1 wherein the extruded decolored meat mass is combined with cooked, diced loin portions of fish.

3. The process of claim 2 wherein the extruded decolored minced meat is combined with loin portions of the fish in a ratio of minced meat extrudate to loin meat selected from the group of ratios consisting of 80/20, 70/30, 60/40, 55/45, 50/50, 45/55 and 40/60.

4. The process of claim 1 wherein from about 10 to about 30 mg of the heat stable red dye are added to each kilogram of minced meat.

5. The process of claim 4 wherein 20 mg of the heat stable red dye are added to each kilogram of minced meat.

6. The process of claim 1 wherein the minced meat mass is mixed with about 1 to about 20% by weight vegetable oil prior to extruding.

7. The process of claim 6 wherein the minced meat mass is mixed with about 1% hydrogenated vegetable oil.

8. The process of claim 1 wherein the extruded minced meat mass is heat set or cooked in a hot water bath with a temperature of at least about 75° C.

9. The process of claim 8 wherein the temperature of the hot water bath is about 75° to 90° C.

10. The process of claim 1 wherein the extruded minced meat is decolored by being immersed in an aqueous solution containing hydrogen peroxide at a level of about 0.2 to about 1% by weight.

11. The process of claim 10 wherein the pH of the solution ranges from 4.0 to 8.0.

12. The process of claim 10 wherein the extruded decolored minced meat is dewatered to about 30% by weight solids level.

13. The process of claim 1 wherein the fish is selected from the group consisting of tuna and tuna-like species.

* * * * *